Patented Dec. 22, 1942

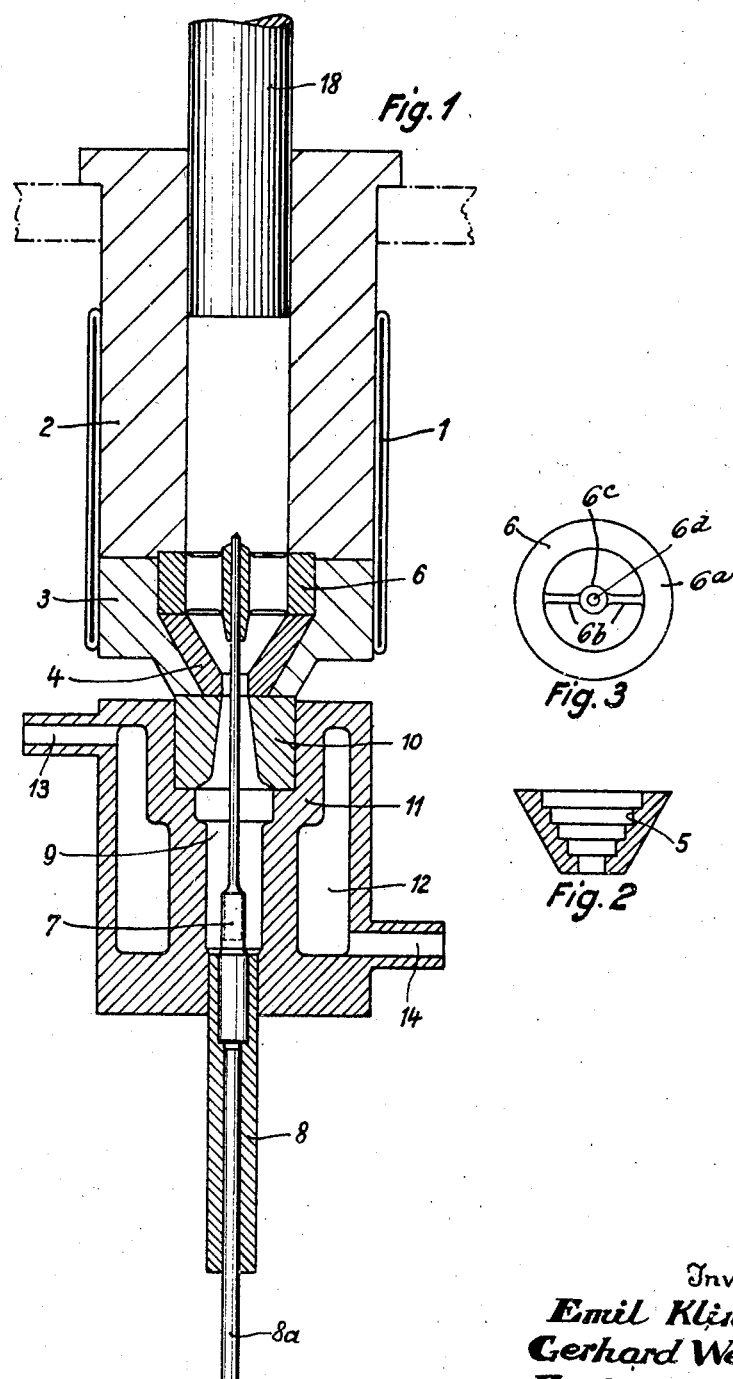

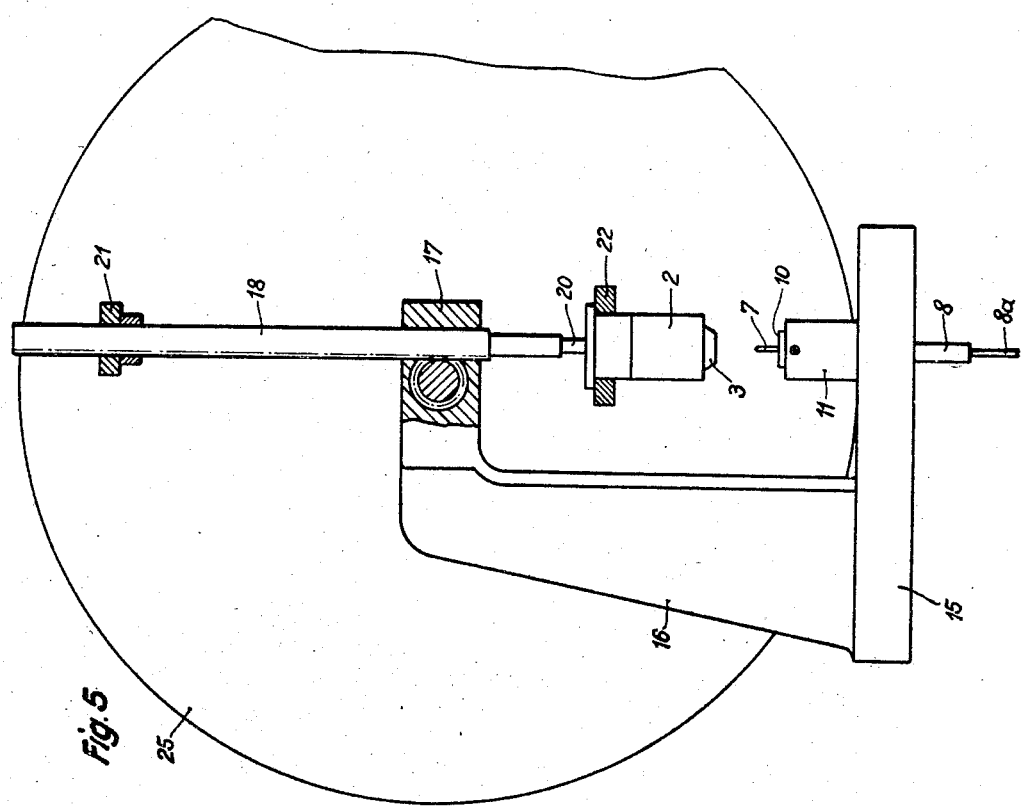
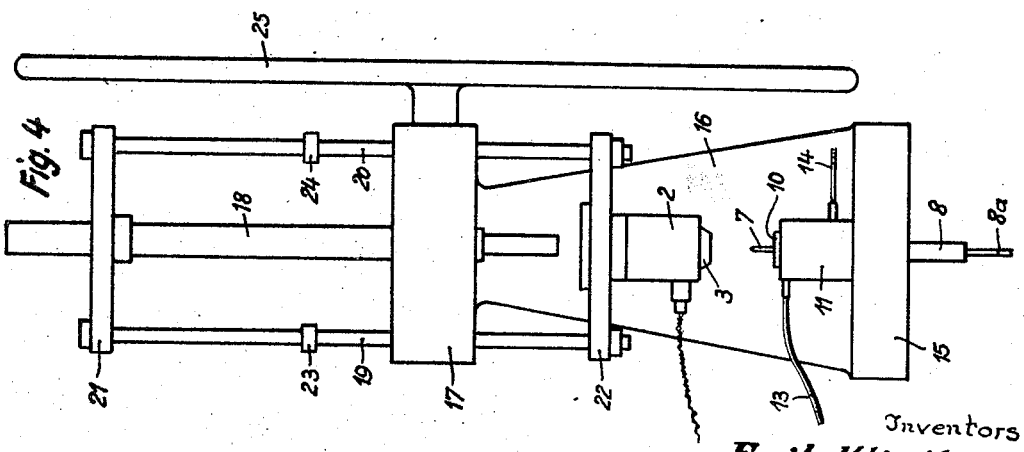

2,305,877

UNITED STATES PATENT OFFICE 2,305,877

PROCESS AND APPARATUS FOR THE PRODUCTION OF SPARKING PLUG INSULATORS

Emil Klingler, Korntal, Gerhard Weitbrecht, Stuttgart-Botnang, and Eugen Dreher, Munchingen, Germany; vested in the Alien Property Custodian Application June 30, 1939, Serial No. 282,282
In Germany July 16, 1938

12 Claims. (Cl. 25—3)

The invention relates to an injection moulding process and an apparatus for the production of sparking plug insulators from masses consisting predominantly of corundum, whereby it is possible to produce moulded articles of extremely uniform composition in respect of both constructional and physical qualities.

According to the present invention, an injection moulding process for making sparking plug insulators provided with a central bore and being of substantially uniform composition comprises injecting ceramic material into a cooling mould in the direction of the central bore. Within the mould the injected material surrounds a needle which produces simultaneously the central bore and the thread in the head of the insulator. The insulator element thus formed is then, after cooling, ejected by pressure applied to the end constituting the head. It has been found that injection of the ceramic mass at that end of the mould which forms the base of the insulator results in a better formation of the thread, because the thread is at the opposite end and consequently the jet settles around the thread moulding element while on the other hand, if the material is injected at the head end, the jet may possibly give rise to interruptions in the thread.

A further feature of the process is that the base of the insulator is finished off only after the drying and/or baking of the mould element. The insulator is then burnt, glazed and prepared for use; or alternatively, after the final treatment of the base, it is coated with glaze, without prior burning, and is then sintered by means of a sharp burning process to form a solid glazed element.

The invention is further distinguished by the manner in which the material is made to flow within the apparatus. The mass of material which is forced into the apparatus under pressure is divided into several separate paths which come together again in the tapering injection nozzle from which the material emerges in a tube-like jet of very small diameter.

Further characteristics or details of the invention are mentioned in suitable parts of the following description of the apparatus.

Figure 1 shows a longitudinal section through the injection apparatus.

Figure 2 is the injection nozzle having step-like grooves on its inner periphery.

Figure 3 is the guide for the needle.

Figure 4 is an elevation of an assembled injection apparatus which may be manually operated, and Figure 5 is a side elevation thereof.

In the apparatus as shown in Figure 1, a heating jacket 1 surrounds the injection cylinder 2 and the injection head 3. The heating of the material in the cylinder 2 and down to the outlet aperture is necessary for two reasons. Firstly, the material, which is made suitable for injection moulding by the addition of an organic binding agent, must be heated to a temperature above room temperature so as to be suitable for moulding, and secondly it has been found to be advisable to maintain the injection material at a constant temperature, if elements having very uniform physical qualities are to be formed. The heating itself may be effected by means of oil, electricity or any other known means. An injection nozzle 4 is cemented into the injection head 3. According to the invention this nozzle consists of burnt ceramic material and in particular such material which is suitable for the manufacture of sparking plug insulators, and it may if desired, be provided with grooves 5 on its inner periphery as shown in Figure 2. These grooves should preferably be formed so as to give a rotary motion to the moulding material and so that they also effect a thorough mixing of the material before it emerges at the injection nozzle. In the injection head 3 is a guide 6 for the needle 7, which is shown separately in Figure 3. In the form illustrated, guide 6 comprises a hollow ring-shaped body portion 6a having a plurality of radial arms or spokes 6b terminating in a central hub 6c provided with an opening or bore 6d, the arrangement being such that the arms and hub project into the path of the material being forced through the guide and divide it into a plurality of separate streams or paths, the central bore 6d receiving and temporarily supporting the upper or free end of the needle 7. The other end of the needle is inserted and removably mounted in an ejector 8 which is combined with another ejector 8a. When it is desired to eject the moulded element from the mould, the element is first slightly raised by ejector 8, and then it is completely ejected by the ejector 8a. All parts of the needle guide 6 are streamlined so as to offer the smallest possible resistance to the flow of the moulding material. The needle 7, which moulds the central bore and the thread in the head of the insulator, is surrounded by the actual moulding chamber 9, which is formed by injection moulds consisting of elements 10 and 11 which are separated, preferably above that part which moulds the collar part of the plug insulator. The head of the mould chamber 9 is provided with the necessary bevels so that the head of the insulator is moulded to the exact shape required. The actual injection mould 11 is enclosed in a cooling jacket 12 into which the cooling agent flows through a supply pipe 13 and after cooling flows out through the outlet pipe 14. The cooling of the mould 12 is very important in the present process, since not only the heat which is applied before the moulding must be withdrawn, but also the additional heat arising during the actual moulding process. Cooling of the moulds by means of water maintained at a constant temperature is found to produce uniform qualities in the moulded elements.

The manually operated injection machine shown in Figures 4 and 5 consists of a base plate 15 on which rests a standard 16. The wide upper end 17 of the standard has a central cavity to receive the plunger 18. On either side of the plunger in the wide end 17 of the standard 16 are two bores which receive the longitudinal struts 19 and 20 which are rigidly connected by means of two traverses 21 and 22 and which are provided with two stops 23 and 24 for limiting the axial movement. The plunger 18 which also passes through the upper traverse 21 may be moved up and down by means of a manually operated wheel 25, either by itself or in conjunction with the injection cylinder 2 and the injection head 3, which are firmly fixed on the lower traverse 22. The injection head 3 may in this manner be lowered on to the injection mould element 11 and the projecting needle 7.

Before the beginning of the injection operation the various parts of the machine stand in the position shown in Figure 4, that is, the injection head 3 and the injection cylinder 2 are raised above the mould 10 whilst the plunger 18 is withdrawn into its outer end position. Then, by means of the manually operated wheel 25, the injection cylinder 2, together with the injection head 3, is lowered towards the upper element 10 of the mould 11 and finally rests upon it. In this position, the nozzle and mould are in contact, with the nozzle opening and the filling orifice of the mould in registry, and with the upper end of the needle projecting into the nozzle and into the opening 6d of the guide 6 whereby the free end of the needle is temporarily guided and supported. The injection cylinder 2 is then filled with ceramic moulding material and is heated to the required temperature. On further turning of the wheel 25, the lower end of the plunger 18 enters the cylinder and forces the moulding material over and around the needle 7 into that end of the covered mould 10 and 11 which forms the foot of the insulator, the material being injected into the mould in the form of a tube-like jet.

The various elements of the machine return to the initial position in the reverse order. When the moulded element is fully compressed, the plunger 18 is withdrawn to its outer end position and then, together with the injection cylinder 2, is removed from the injection mould 10 and 11. The moulded sparking plug insulator is ejected together with the needle 7 and the upper part of the mould 10, by means of the two ejectors 8 and 8a. The ejector 8 raises the moulded element slightly and the other ejector 8a completes the ejection of the insulator which is thus produced without any mechanical damage. When the injection needle 7 has been screwed out of the moulded element, the latter is dried and if desired baked. After the foot of the insulator has been finished off, the rough or alternatively dried or baked sparking plug insulator may be finished off by a burning process. Instead of operation by hand it is possible to use some other source of power, in which case, however, it is usually advisable to house the entire apparatus in automatic injection machines, preferably machines of a type which are suitable for the manufacture of moulded elements from moulded masses of synthetic resin.

We declare, that what we claim is:

1. An injection moulding apparatus, for making sparking plug insulator elements having a central bore extending from end to end thereof, and an internal thread at one end of said bore, and being of substantially uniform composition, from a ceramic material, comprising a mould having a filling orifice at one end, a needle for moulding the bore and thread located within and projecting through said mould, a cooling jacket surrounding said mould, an injection cylinder, a heating jacket surrounding said cylinder, an injection nozzle of burnt ceramic material carried by said cylinder, a steel element to which said nozzle is cemented, a substantially streamlined guide, for temporarily receiving and supporting one end of said needle, disposed in the nozzle, means for alternately connecting and separating said nozzle and mould orifice and said guide and needle, respectively, and an ejector disposed at the end of the mould opposite said filling orifice and removably mounting the other end of said needle, to displace the moulded element from the mould together with said needle.

2. An injection moulding apparatus for making spark plug insulator elements, having a central bore extending from end to end thereof, from a ceramic material, comprising a cylinder provided with a nozzle, means for heating said cylinder, a mould having a filling orifice at one end and an ejector at the other end, means for cooling said mould, a bore-forming needle, extending longitudinally through said mould, with one end carried by said ejector and the other end projecting through said filling orifice, a guide, mounted within said nozzle, for temporarily receiving and supporting the projecting end of said needle, means for bringing said nozzle and orifice into registry and to cause the projecting end of the needle to enter said nozzle and guide, pressure means for forcing material from said cylinder into said mould, means for separating said nozzle and orifice and for withdrawing said needle from said nozzle and guide, and means for operating said ejector to displace the moulded element and said needle from the mould.

3. An injection moulding apparatus for making spark plug insulator elements, having a central bore extending from end to end thereof, from a ceramic material, comprising a cylinder provided with a nozzle, means for heating said cylinder, a mould having a filling orifice at one end and an ejector at the other end, means for cooling said mould, a bore-forming needle, extending longitudinally through said mould, with one end removably mounted in said ejector and the other end projecting through said filling orifice, a guide, mounted within said nozzle, for temporarily receiving and supporting the projecting end of said needle, means for bringing said nozzle and orifice into registry and to cause the projecting end of the needle to enter said nozzle and guide, pressure means for forcing material from said cylinder into said mould, means for separating said nozzle and orifice and for withdrawing said needle from said nozzle and guide, and means for operating said ejector to displace the moulded element together with said needle from the mould.

4. A process for making a sparking plug insulator element, of substantially uniform composition, from a ceramic mixture, and having a base end and a head end with a central bore connecting said ends, in an imporous cooling mould having a base-producing end, a head-producing end and a bore-forming needle extending longitudinally through said mould from end to end, which comprises preparing a mixture of ceramic material and organic binding material and heating to render said mixture plastic and capable of being injection moulded, subjecting said heated mixture to very high pressure to cause said mixture to flow in a single stream while maintaining it at a substantially constant temperature higher than room temperature, dividing said single stream into a plurality of streams, subsequently compacting and uniting said plurality of streams into a substantially solid single stream of smaller diameter than the first single stream and then injecting the compacted single stream in the form of a single jet into the mould in the direction of the central bore from the base-producing end of the mould, ejecting the element produced in said mould, together with said bore-forming needle, by pressure applied directly to the head end of said element and subsequently removing said bore-forming needle from said element.

5. A process for making a sparking plug insulator element, of substantially uniform composition, from a ceramic mixture, and having a base end and a head end with a central bore connecting said ends, in a cooling mould having a base-producing end, a head-producing end and a bore-forming needle extending longitudinally through said mould from end to end, which comprises preparing a mixture of ceramic material and organic binding material and heating to render said mixture plastic and capable of being injection moulded, subjecting said heated mixture to very high pressure to cause said mixture to flow in a single stream while maintaining it at a substantially constant temperature, dividing said single stream into a plurality of streams, subsequently compacting and uniting said plurality of streams into a substantially solid single stream of smaller diameter than the first single stream and then injecting the compacted single stream in the form of a single jet into the mould in the direction of the central bore from the base-producing end of the mould, cooling said mould to maintain it at a substantially constant temperature, ejecting the element produced in said mould, together with said bore-forming needle, by pressure applied directly to the head end of said element, and subsequently removing said bore-forming needle from said element.

6. A process for making a sparking plug insulator element, of substantially uniform composition, from a ceramic mixture, and having a base end, a head end with a central bore connecting said ends and an enlarged collar intermediate said ends, in a longitudinally-separable two-part imporous cooling mould, maintained at a substantially constant temperature, and having a base-producing end comprising one part, a head-producing end comprising the other part, and a bore-forming needle extending longitudinally through said mould from end to end, which comprises preparing a mixture of ceramic material and organic binding material and heating to render said mixture plastic and capable of being injection moulded, subjecting said heated mixture to very high pressure to cause said mixture to flow in a single stream, dividing said single stream into a plurality of streams, subsequently compacting and uniting said plurality of streams into a substantially solid single stream of smaller diameter than the first single stream and then injecting the compacted single stream in the form of a single jet into the mould in the direction of the central bore from the base-producing end of the mould, ejecting the element produced in said mould, together with said bore-forming needle and the base-producing part of the mould, by pressure applied directly to the head end of said element, and subsequently removing said bore-forming needle and the base-producing part of the mould from said element.

7. A process for making a sparking plug insulator element, of substantially uniform composition, from a ceramic mixture, and having a base end, a head end having an external bevel, and a central bore having an internal thread at the head end of said bore, connecting said ends, in an imporous cooling mould, maintained at a substantially constant temperature, and having a base-producing end, a head-producing end, a bore-forming needle extending longitudinally through said mould from end to end, which comprises preparing a mixture of ceramic material and organic binding material and heating to render said mixture plastic and capable of being injection moulded, subjecting said heated mixture to very high pressure to cause said mixture to flow and then moving said mixture in a plurality of streams, subsequently uniting said streams and injecting the united streams in the form of a single, compacted jet into the mould in the direction of the central bore from the base-producing end of the mould, partially ejecting the element produced in said mould, together with said bore forming needle, by pressure applied directly to the head end of said element, completing the ejection of said element and needle by pressure applied to said needle, and subsequently removing said needle from said element.

8. A process for making a sparking plug insulator element, of substantially uniform composition, from a ceramic mixture, and having a base end, a head end having an external bevel and a central bore, having an internal thread at the head end of said bore, connecting said ends, in a cooling mould, maintained at a substantially constant temperature, and having a base-producing end, a head-producing end, and a needle contained in said mould for forming said bore and internal thread, which comprises preparing a mixture of ceramic material and organic binding material and heating to render said mixture plastic and capable of being injection moulded, subjecting said heated mixture to very high pressure to cause said mixture to flow and then moving said mixture in a plurality of streams, subsequently uniting said streams and injecting the united streams in the form of a single, compacted jet into the mould in the direction of the central bore from the base-producing end of the mould and ejecting the element produced in said mould, together with said needle, by pressure applied directly to the head of said element.

9. A process including the steps of claim 8, and which comprises removing the needle from the element after ejection of the element from the mould.

10. A process including the steps of claim 8, and which comprises removing the needle from the element after ejection of the element from the mould, drying and baking said element and then finishing the base end of the said moulded element.

11. An injection moulding apparatus for making spark plug insulator elements, having a central bore extending from end to end thereof, from a ceramic material, comprising a cylinder provided with a nozzle, a mould having a filling orifice at one end and an ejector at the other end, a bore-forming needle, extending longitudinally through said mould, with one end carried by said ejector and the other end projecting through said filling orifice, a guide, mounted within said nozzle, for temporarily receiving and supporting the projecting end of said needle, means for bringing said nozzle and orifice into registry and to cause the projecting end of the needle to enter said nozzle and guide, pressure means for forcing material from said cylinder into said mould, means for separating said nozzle and orifice and for withdrawing said needle from said nozzle and guide, and means for operating said ejector to displace the moulded element and said needle from the mould.

12. An injection moulding apparatus for making spark plug insulator elements, having a central bore extending from end to end thereof, from a ceramic material, comprising a cylinder provided with a nozzle, means in said cylinder to divide the single stream of material formed in said cylinder into a plurality of streams and said nozzle being formed to unite and compact said plurality of streams into a single substantially solid stream of smaller size than the original stream before said united stream emerges from said nozzle, a mould having a filling orifice at one end and an ejector at the other end, a bore-forming needle, extending longitudinally through said mould, with one end carried by said ejector and the other end projecting through said filling orifice, a guide, mounted within said nozzle, for temporarily receiving and supporting the projecting end of said needle, means for bringing said nozzle and orifice into registry and to cause the projecting end of the needle to enter said nozzle and guide, pressure means for forcing material from said cylinder into said mould, means for separating said nozzle and orifice and for withdrawing said needle from said nozzle and guide, and means for operating said ejector to displace the moulded element and said needle from the mould.

EMIL KLINGLER.
GERHARD WEITBRECHT.
EUGEN DREHER.